US012581298B2

(12) United States Patent
Kim et al.

(10) Patent No.: US 12,581,298 B2
(45) Date of Patent: Mar. 17, 2026

(54) METHOD AND APPARATUS FOR AUTHENTICATING USER EQUIPMENT IN WIRELESS COMMUNICATION SYSTEM

(71) Applicant: LG ELECTRONICS INC., Seoul (KR)

(72) Inventors: Dongjoo Kim, Seoul (KR); Anbin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 18/184,216

(22) Filed: Mar. 15, 2023

(65) Prior Publication Data

US 2023/0336992 A1      Oct. 19, 2023

Related U.S. Application Data

(60) Provisional application No. 63/330,322, filed on Apr. 13, 2022.

(51) Int. Cl.
H04W 12/069      (2021.01)
H04W 88/04      (2009.01)

(52) U.S. Cl.
CPC .......... H04W 12/069 (2021.01); H04W 88/04 (2013.01)

(58) Field of Classification Search
CPC ... H04W 12/069; H04W 88/04; H04W 12/06; H04W 8/20; H04W 76/14; H04W 92/18; H04L 63/0853
See application file for complete search history.

(56) References Cited

U.S. PATENT DOCUMENTS

2022/0141898 A1*   5/2022   Kim ...................... H04W 76/14
                                                     370/315
2022/0248484 A1*   8/2022   Wang .................... H04W 76/15
                         (Continued)

FOREIGN PATENT DOCUMENTS

WO      WO-2023138813 A1 *   7/2023   ............. H04L 9/088

OTHER PUBLICATIONS

3GPP TR 33.847 v17.1.0 (Mar. 2022) 3rd Generation Partnership Project; Technical Specification Group Services and System Aspects; Study on security aspects of enhancement for proximity based services in the 5G System (5GS) (Release 17) (Year: 2022).*
                         (Continued)

*Primary Examiner* — Nizar N Sivji
(74) *Attorney, Agent, or Firm* — LEE, HONG, DEGERMAN, KANG & WAIMEY

(57)      ABSTRACT

Disclosed herein is a method for authenticating a UE in a wireless communication system, including: receiving, by a relay UE, a direct communication request message from a remote UE; identifying, by the relay UE, authentication for the remote UE based on the direct communication request message; and transmitting, by the relay UE, a direct communication accept message to the remote UE, and the direct communication request message may include at least one of a first unique identifier or a primary authentication-related key ID of the remote UE, and the direct communication accept message may include an indicator indicating whether secondary authentication of a protocol data unit (PDU) session of the relay UE, which the remote UE uses, is pending.

12 Claims, 16 Drawing Sheets

(56) References Cited

U.S. PATENT DOCUMENTS

2023/0363035 A1* 11/2023 Zhang ................ H04B 7/15507
2025/0175792 A1* 5/2025 Mavureddi Dhanasekaran ..........
H04B 7/155
2025/0220425 A1* 7/2025 Ferdi ................... H04W 12/069

OTHER PUBLICATIONS

European Patent Office Application Serial No. 23162312.5, Search Report dated Sep. 1, 2023, 11 pages.
3rd Generation Partnership Project, "Technical Specification Group Services and System Aspects; Study on security aspects of enhancement for proximity based services in the 5G System (5GS) (Release 17)," 3GPP TR 33.847 V17.1.0, Mar. 2022, 166 pages.
3rd Generation Partnership Project, "Technical Specification Group Services and System Aspects; Security Aspects of Proximity based Services (ProSe) in the 5G System (5GS) (Release 17)," 3GPP TS 33.503 V0.3.0, Mar. 2022, 42 pages.
Qualcomm Incorporated, "Open issues for control plane authentication/ authorisation and secondary authentication for L3 UE-NW Relays," S2-2201999, 3GPP TSG-SA WG2#150E, e-meeting, Apr. 2022, 8 pages.
3rd Generation Partnership Project, "Technical Specification Group Services and System Aspects; Procedures for the 5G System (5GS); Stage 2 (Release 17)," 3GPP TS 23.502 V17.4.0, Mar. 2022, 738 pages.

* cited by examiner

FIG. 3 eNB

| inter-cell RRM |

| RB control |

| connection mobility control |

| radio grant control |

| configuration and provision of BS measurement |

| dynamic resource allocation (scheduler) |

| RRC |

| RLC |

| MAC |

| PHY |

E-UTRAN

MME

| NAS |

| idle state mobility handling |

| EPS bearer control |

S-GW

| mobility anchoring |

P-GW

| UE IP address allocation |

| packet filtering |

EPC

METHOD AND APPARATUS FOR AUTHENTICATING USER EQUIPMENT IN WIRELESS COMMUNICATION SYSTEM

CROSS REFERENCE TO RELATED APPLICATION(S)

Pursuant to 35 U.S.C. § 119(e), this application claims the benefit of U.S. Provisional Patent Application No. 63/330,322, filed on Apr. 13, 2022, the contents of which are all hereby incorporated by reference herein in their entireties.

BACKGROUND

Field

The present disclosure relates to a wireless communication system, that is, to a method for authenticating a user equipment. More particularly, the present disclosure relates to a method for a relay user equipment (UE) and a relay UE network to identify and authenticate a remote UE in a secondary authentication process of the remote UE that communicates with a core network based on UE-network relay.

Description of the Related Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure may provide a method and apparatus for authenticating a UE in a wireless communication system.

The present disclosure may provide a method for a relay UE and a network of the relay UE to identify a remote UE in a secondary authentication process of the remote UE that communicates with a core network through the relay UE based on UE-network relay in a wireless communication system.

The present disclosure may provide a method for determining whether secondary authentication is required in an authentication server of a data network that a remote UE wants to access in a wireless communication system.

The present disclosure may provide a method for a relay UE to acquire identification information of a remote UE through a network function based on ProSe in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method for authenticating a UE in a wireless communication system may include: receiving, by a relay UE, a direct communication request message from a remote UE; identifying, by the relay UE, authentication for the remote UE based on the direct communication request message; and transmitting, by the relay UE, a direct communication accept message to the remote UE, and the direct communication request message may include at least one of a first unique identifier or a primary authentication-related key ID of the remote UE, and the direct communication accept message may include an indicator indicating whether secondary authentication of a protocol data unit (PDU) session of the relay UE, which the remote UE uses, is pending.

As an example of the present disclosure, a relay UE operating in a wireless communication system may include at least one transceiver, at least one processor, and at least one memory coupled with the at least one processor in an operable manner and configured, when operated, to store instructions for the at least one processor to implement a specific operation, wherein the specific operation may be configured to control the transceiver to receive a direct communication request message from a remote UE, to identify authentication for the remote UE based on the direct communication request message and to control the transceiver to transmit a direct communication accept message to the remote UE, and wherein the direct communication request message may include at least one of a first unique identifier or a primary authentication-related key ID of the remote UE, and the direct communication accept message may include an indicator indicating whether secondary authentication of a PDU session of the relay UE, which the remote UE uses, is pending.

In addition, as an example of the present disclosure, a method for authenticating a UE in a network of a wireless communication system may include: receiving, from a relay UE, a remote UE report including primary authentication key-related ID for a remote UE and information on the remote UE; acquiring a unique identifier of the remote UE from a first entity based on the primary authentication key-related ID; acquiring remote UE subscription information from a network of the remote UE based on the unique identifier of the remote UE; and performing secondary authentication for a data network indicated based on the remote UE subscription information.

In addition, as an example of the present disclosure, a network operating in a wireless communication system may include at least one transceiver, at least one processor, and at least one memory coupled with the at least one processor in an operable manner and configured, when operated, to store instructions for the at least one processor to implement a specific operation, wherein the specific operation may be configured to: control the transceiver to receive, from a relay UE, a remote UE report including a primary authentication key-related ID for a remote UE and information on the remote UE, control the transceiver to acquire a unique identifier of the remote UE from a first entity based on the primary authentication key-related ID, control the transceiver to acquire remote UE subscription information from a network of the remote UE based on the unique identifier of the remote UE, and perform secondary authentication for a data network indicated based on the remote UE subscription information.

In addition, the following aspects may commonly apply.

As an example of the present disclosure, a direct communication request message may further include a relay service code, and a relay UE may identify whether secondary authentication is needed for a data network associated with a PDU session of the relay UE, which is used by a remote UE that is connected based on the relay service code.

In addition, as an example of the present disclosure, a relay UE may identify whether secondary authentication is needed for a data network associated with a PDU session of a relay UE, which a remote UE uses, based on whether the relay UE has performed the secondary authentication in a process of generating or modifying the PDU session of the relay UE associated with the data network for a relay service.

In addition, as an example of the present disclosure, in case a relay UE performs secondary authentication in a process of generating or modifying a PDU session of the relay UE, secondary authentication is needed for a data network associated with the PDU session of the relay UE that a remote UE uses, and in case the relay UE does not perform secondary authentication in the process of generating or modifying the PDU session of the relay UE, secondary authentication may not be needed for the data network associated with the PDU session of the relay UE that the remote UE uses.

In addition, as an example of the present disclosure, secondary authentication is needed for a data network associated with a PDU session of a relay UE which a remote UE uses, and in case the relay UE does not store secondary authentication execution information of the remote UE, an indicator indicating whether secondary authentication of the PDU session of the relay UE that the remote UE uses is pending may be included in a direct communication accept message and be transmitted to the remote UE.

In addition, as an example of the present disclosure, in case a remote UE and a relay UE have not completed primary authentication, a direct communication request message may include a first unique identifier of the remote UE, and in case the remote UE and the relay UE have completed primary authentication, the direct communication request message may include a primary authentication-related key ID.

In addition, as an example of the present disclosure, in case a relay UE acquires a primary authentication-related key ID through a direct communication request message, the relay UE may deliver the primary authentication-related key ID and information on a remote UE to a network of the relay UE.

In addition, as an example of the present disclosure, a network of a relay UE may acquire a second unique identifier of a remote UE from a first entity based on a primary authentication-related key ID, and the network of the relay UE may identify subscription information of the remote UE from a network of the remote UE based on the acquired second unique identifier of the remote UE and identify whether secondary authentication is needed for a data network indicated based on the subscription information of the remote UE.

In addition, as an example of the present disclosure, in case secondary authentication is needed for a data network indicated based on subscription information of a remote UE, a network of a relay UE may perform secondary authentication for the data network indicated based on the remote UE and the subscription information of the remote UE.

In addition, as an example of the present disclosure, a second unique identifier may be a subscription permanent identifier (SUPI) of a remote UE.

In addition, as an example of the present disclosure, a first unique identifier may be a subscription concealed identifier (SUCI) of a remote UE, and a primary authentication key-related ID may be a 5GPRUK ID.

The present disclosure may provide a method for identifying a UE in a wireless communication system.

The present disclosure has an effect that a relay UE and a network of the relay UE identify a remote UE in a secondary authentication process of the remote UE that communicates with a core network through the relay UE based on UE-network relay in a wireless communication system.

The present disclosure has an effect of providing a method for determining whether secondary authentication is required in an authentication server of a data network that a remote UE wants to access in a wireless communication system.

The present disclosure has an effect of providing a method for a relay UE to acquire identification information of a remote UE through a network function based on ProSe in a wireless communication system.

The technical objects to be achieved in the present disclosure are not limited to the above-mentioned technical objects, and other technical objects that are not mentioned may be considered by those skilled in the art through the embodiments described below.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 3 is a view illustrating a general E-URTAN and an example of an architecture of an evolved packet core (EPC).

DETAILED DESCRIPTION

Figure 1:
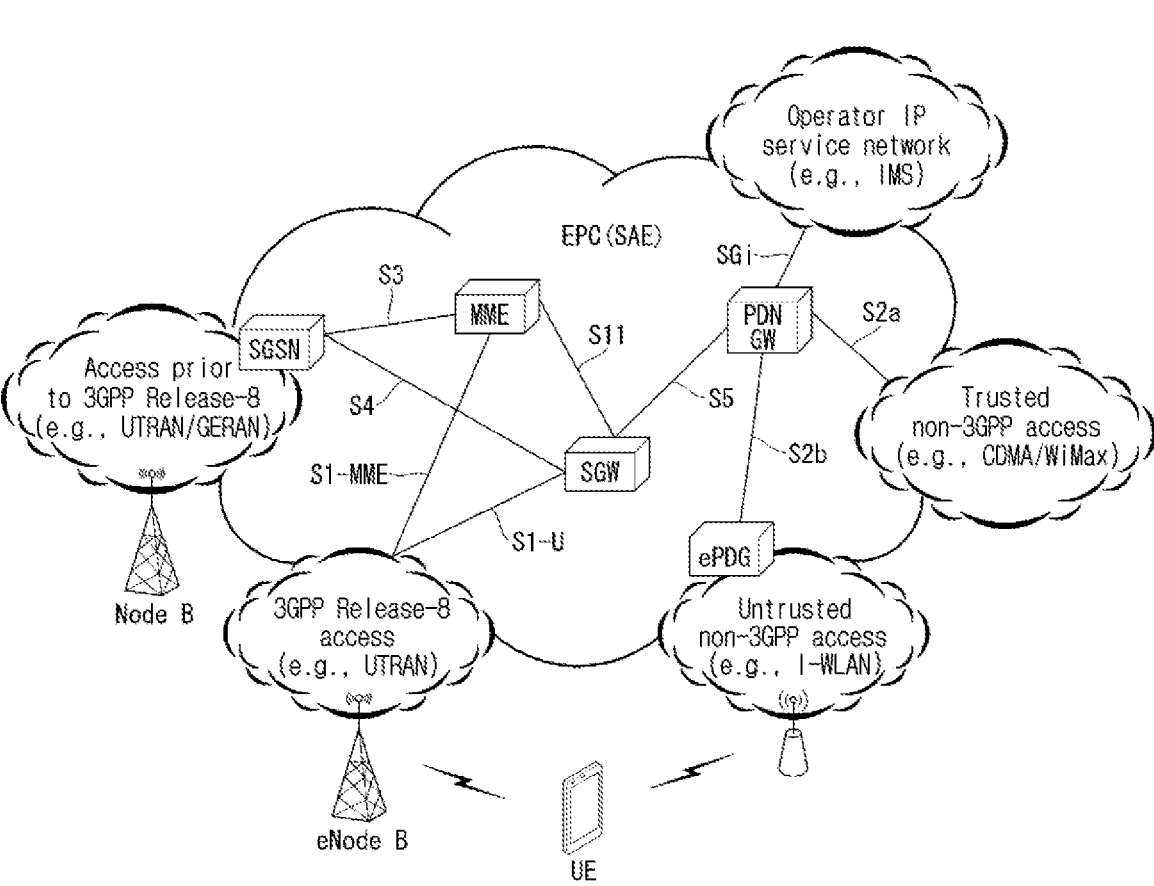
FIG. 1 is a view illustrating various reference points.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B (eNB)", "gNode B (gNB)", "ng-eNB", "advanced base station (ABS)", or "access point".

Also, in the embodiments of the present disclosure, "terminal" may be replaced by such terms as "user equipment (UE)", "mobile station (MS)", "subscriber station (SS)", "mobile subscriber station (MSS)", "mobile terminal" or "advanced mobile station (AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

For clarity of explanation, the descriptions below are based on a 3GPP communication system (e.g. LTE, NR and the like), but the technical idea of the present disclosure is not limited thereto. LTE may mean a technology after 3GPP TS 36.xxx Release 8. Specifically, the LTE technology after 3GPP TS 36.xxx Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx' means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

For terms, abbreviations, and other backgrounds that may be used in this document, reference may be made to the following standard document descriptions published prior to this document. In particular, terms, abbreviations, and other background technologies related to LTE/EPS (Evolved Packet System) may refer to 36.xxx series, 23.xxx series, and 24.xxx series, and NR (new radio)/5GS related terms and abbreviations and other backgrounds may refer to the 38.xxx series, 23.xxx series and 24.xxx series.

3GPP LTE/EPS

3GPP TS 36.211: Physical channels and modulation

3GPP TS 36.212: Multiplexing and channel coding

3GPP TS 36.213: Physical layer procedures

3GPP TS 36.214: Physical layer; Measurements

3GPP TS 36.300: Overall description

3GPP TS 36.304: User Equipment (UE) procedures in idle mode

3GPP TS 36.306: User Equipment (UE) radio access capabilities

3GPP TS 36.314: Layer 2-Measurements

3GPP TS 36.321: Medium Access Control (MAC) protocol

3GPP TS 36.322: Radio Link Control (RLC) protocol

3GPP TS 36.323: Packet Data Convergence Protocol (PDCP)

3GPP TS 36.331: Radio Resource Control (RRC) protocol

3GPP TS 36.413: S1 Application Protocol (S1AP)

3GPP TS 36.423: X2 Application Protocol (X2AP)

3GPPP TS 22.125: Unmanned Aerial System support in 3GPP; Stage 1

3GPP TS 23.303: Proximity-based services (Prose); Stage 2

3GPP TS 23.401: General Packet Radio Service (GPRS) enhancements for Evolved Universal Terrestrial Radio Access Network (E-UTRAN) access 3GPP TS 23.402: Architecture enhancements for non-3GPP accesses 3GPP TS 23.286: Application layer support for V2X services; Functional architecture and information flows 3GPP TS 24.301: Non-Access-Stratum (NAS) protocol for Evolved Packet System (EPS); Stage 3

3GPP TS 24.302: Access to the 3GPP Evolved Packet Core (EPC) via non-3GPP access networks; Stage 3

3GPP TS 24.334: Proximity-services (ProSe) User Equipment (UE) to ProSe function protocol aspects; Stage 3

3GPP TS 24.386: User Equipment (UE) to V2X control function; protocol aspects; Stage 3

3GPP NR/5GS

3GPP TS 38.211: Physical channels and modulation

3GPP TS 38.212: Multiplexing and channel coding

3GPP TS 38.213: Physical layer procedures for control

3GPP TS 38.214: Physical layer procedures for data

3GPP TS 38.215: Physical layer measurements

3GPP TS 38.300: NR and NG-RAN Overall Description

3GPP TS 38.304: User Equipment (UE) procedures in idle mode and in RRC inactive state 3GPP TS 38.321: Medium Access Control (MAC) protocol 3GPP TS 38.322: Radio Link Control (RLC) protocol 3GPP TS 38.323: Packet Data Convergence Protocol (PDCP)

3GPP TS 38.331: Radio Resource Control (RRC) protocol

3GPP TS 37.324: Service Data Adaptation Protocol (SDAP)

3GPP TS 37.340: Multi-connectivity; Overall description

3GPP TS 23.501: System Architecture for the 5G System

3GPP TS 23.502: Procedures for the 5G System

3GPP TS 23.503: Policy and Charging Control Framework for the 5G System; Stage 2

3GPP TS 24.501: Non-Access-Stratum (NAS) protocol for 5G System (5GS); Stage 3

3GPP TS 24.502: Access to the 3GPP 5G Core Network (5GCN) via non-3GPP access networks 3GPP TS 24.526: User Equipment (UE) policies for 5G System (5GS); Stage 3

3GPP V2X

3GPP TS 23.285: Architecture enhancements for V2X services

3GPP TR 23.786: Evolved Packet System (EPS) and the 5G System (5GS) to support advanced V2X services 3GPP TS 23.287: Architecture enhancements for 5G System (5GS) to support Vehicle-to-Everything (V2X) services 3GPP TS 24.587: Vehicle-to-Everything (V2X) services in 5G System (5GS); Protocol aspects; Stage 3

3GPP TS 24.588: Vehicle-to-Everything (V2X) services in 5G System (5GS); User Equipment (UE) policies; Stage 3

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 1 illustrates various reference points.

An example of the network structure of FIG. 1 discloses an LTE/EPS-based network structure, and may operate with reference to matters described in standard documents published before this document. In the network structure of FIG. 1, at least one of SGW, PDN GW, MME, SGSN, and ePDG entities may operate with reference to matters described in standard documents published before this document. In addition, S1-MME, S1-U, S2a, S2b, S3, S4, S5, S11, and SGi may exist as interfaces between each entity, which are described in the standard document published before this document. can do. In addition, other entities and interfaces may be configured with reference to matters described in standard documents published before this document described above, and are not limited to specific forms.

Figure 2:
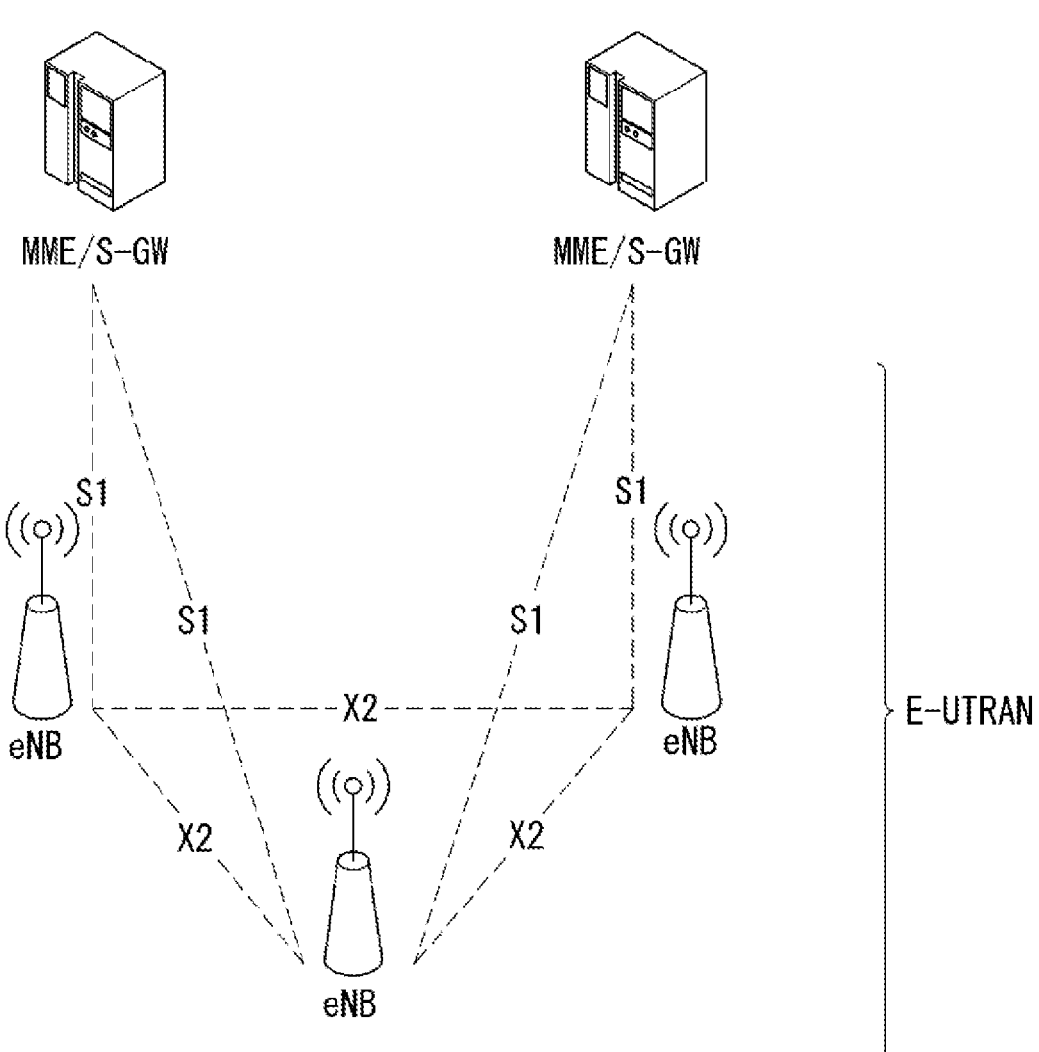
FIG. 2 is a view illustrating an example of a network structure of an evolved universal terrestrial radio access network (E-UTRAN) to which the present disclosure is applicable.

FIG. 2 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 2, an E-UMTS network includes an E-UTRAN, an EPC, and one or more UEs. The E-UTRAN consists of eNBs that provide control plane and user plane protocols to the UE, and the eNBs are interconnected with each other by means of the X2 interface, and reference may be made to matters described in standard documents published before this document.

FIG. 3 is a view illustrating a general E-URTAN and an example of an architecture of an evolved packet core (EPC).

As illustrated in FIG. 3, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures combining 5G and 4G. And 3GPP TS 23.501 shows an architecture using NR and NGC.

Figure 4:
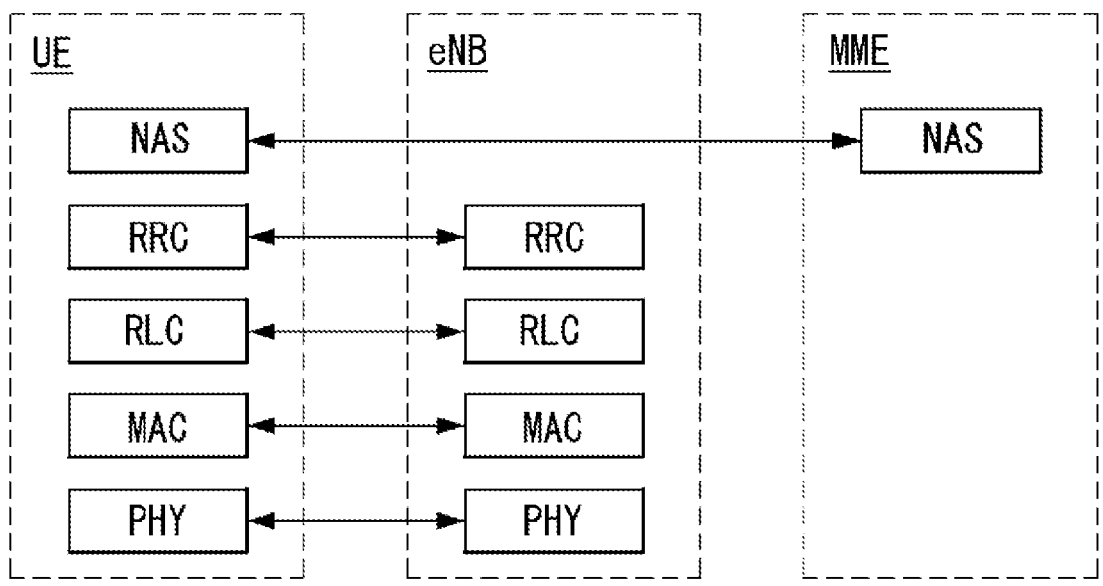
FIG. 4 is a view illustrating an example of a structure of a radio interface protocol in a control plane between user equipment (UE) and evolved node B (eNB).
Figure 5:
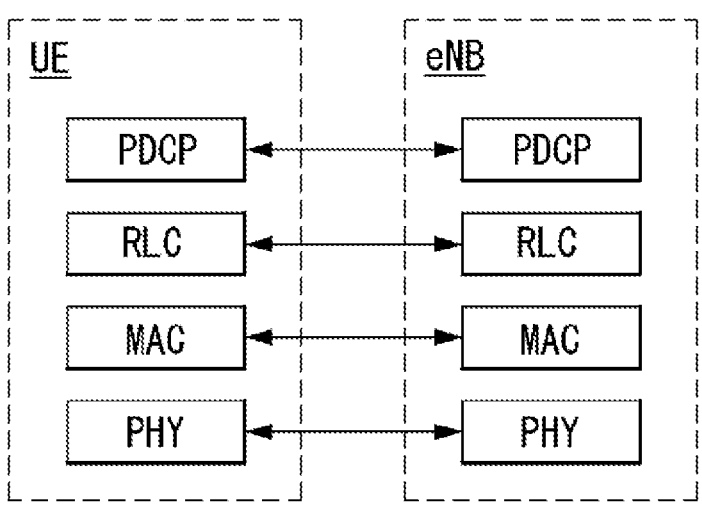
FIG. 5 is a view illustrating an example of a structure of a radio interface protocol in a user plane between UE and eNB.
Figure 5:
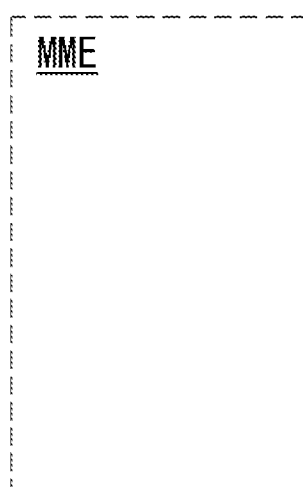

FIG. 4 is a view illustrating an example of a structure of a radio interface protocol in a control plane between user equipment (UE) and evolved node B (eNB), and FIG. 5 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems, and it is possible to refer to the matters described in the standard document published before this document described above.

Figure 6:
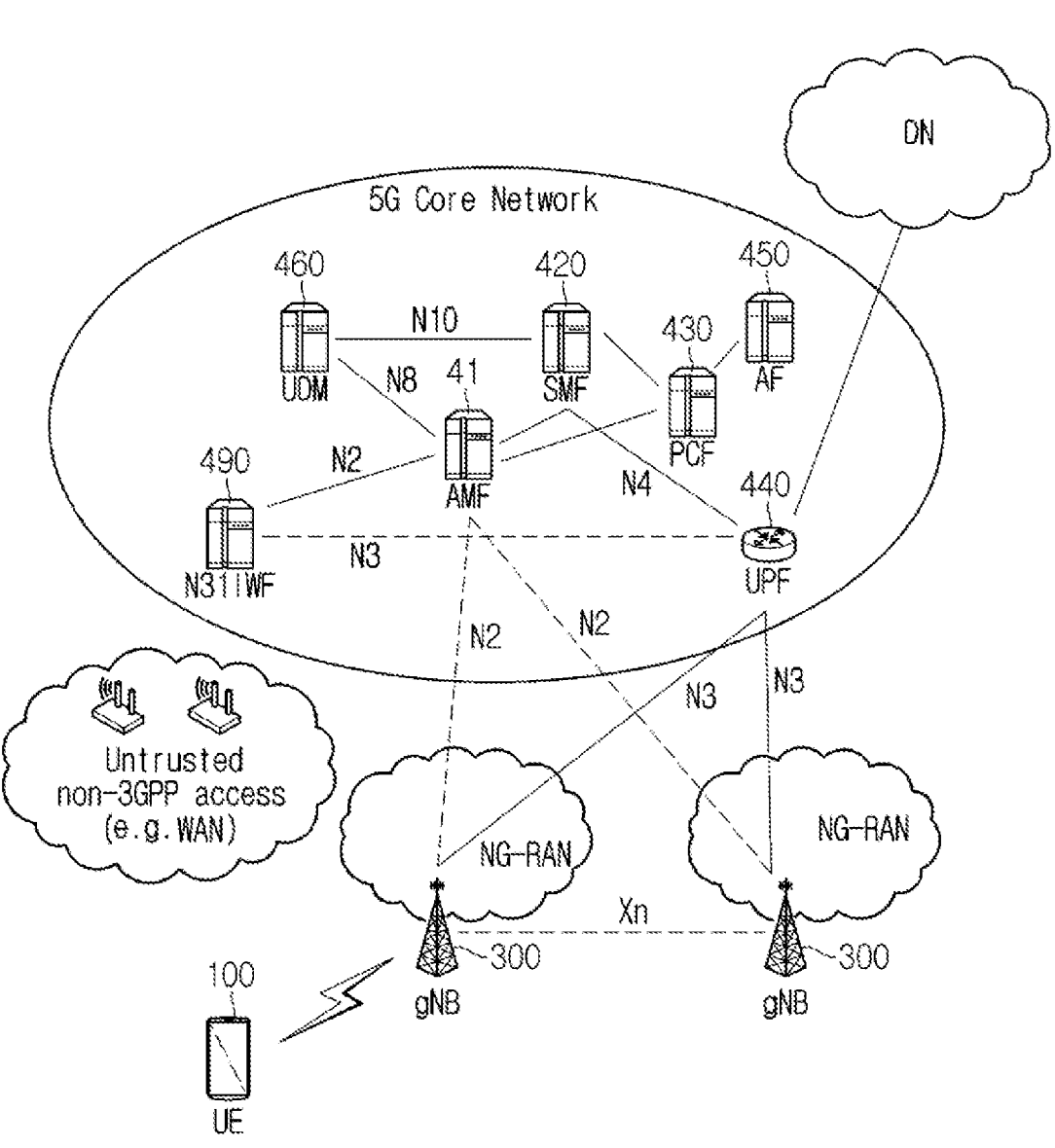
FIG. 6 is a view illustrating an example of an architecture of a general new radio (NR)-radio access network (RAN).

FIG. 6 is a view illustrating an example of a wireless communication system that is applied to the present disclosure.

5GC (5G Core) may include various components, part of which are shown in FIG. 6, including an access and mobility management function (AMF) 410, a session management function (SMF) 420, a policy control function (PCF) 430, a Prose user plane function (UPF) 440, an application function (AF) 450, unified data management (UDM) 460, and a non-3GPP interworking function (N3IWF) 490.

A UE 100 is connected to a data network via the UPF 440 through a next generation radio access network (NG-RAN) including the gNB 300. The UE 100 may be provided with a data service even through untrusted non-3GPP access, e.g., a wireless local area network (WLAN). In order to connect the non-3GPP access to a core network, the N3IWF 490 may be deployed.

The N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The AMF 410 may manage access and mobility in the 5G system. The AMF 410 may perform a function of managing (non-access stratum) NAS security. The AMF 410 may perform a function of handling mobility in an idle state.

The UPF 440 performs a function of gateway for transmitting and receiving user data. The UPF node 440 may perform the entirety or a portion of a user plane function of a serving gateway (S-GW) and a packet data network gateway (P-GW) of 4G mobile communication.

The UPF 440 is a component that operates as a boundary point between a next generation radio access network (NG-RAN) and the core network and maintains a data path between the gNB 300 and the SMF 420. In addition, when the UE 100 moves over an area served by the gNB 300, the UPF 440 serves as a mobility anchor point. The UPF 440 may perform a function of handling a PDU. For mobility within the NG-RAN (which is defined after 3GPP Release-15), the UPF 440 may route packets. In addition, the UPF 440 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The PCF 430 is a node that controls an operator's policy. The AF 450 is a server for providing various services to the UE 100. The UDM 460 is a server that manages subscriber information, such as home subscriber server (HSS) of 4G mobile communication. The UDM 460 stores and manages the subscriber information in a unified data repository (UDR).

The SMF 420 may perform a function of allocating an Internet protocol (IP) address of the UE 100. In addition, the SMF 420 may control a packet data unit (PDU) session.

For convenience of explanation, hereinafter, reference numerals may be omitted for AMF 410, SMF 420, PCF 430, UPF 440, AF 450, UDM 460, N3IWF 490, gNB 300, or UE 100, which may operate with reference to contents described in standard documents released earlier than the present document.

Figure 7:
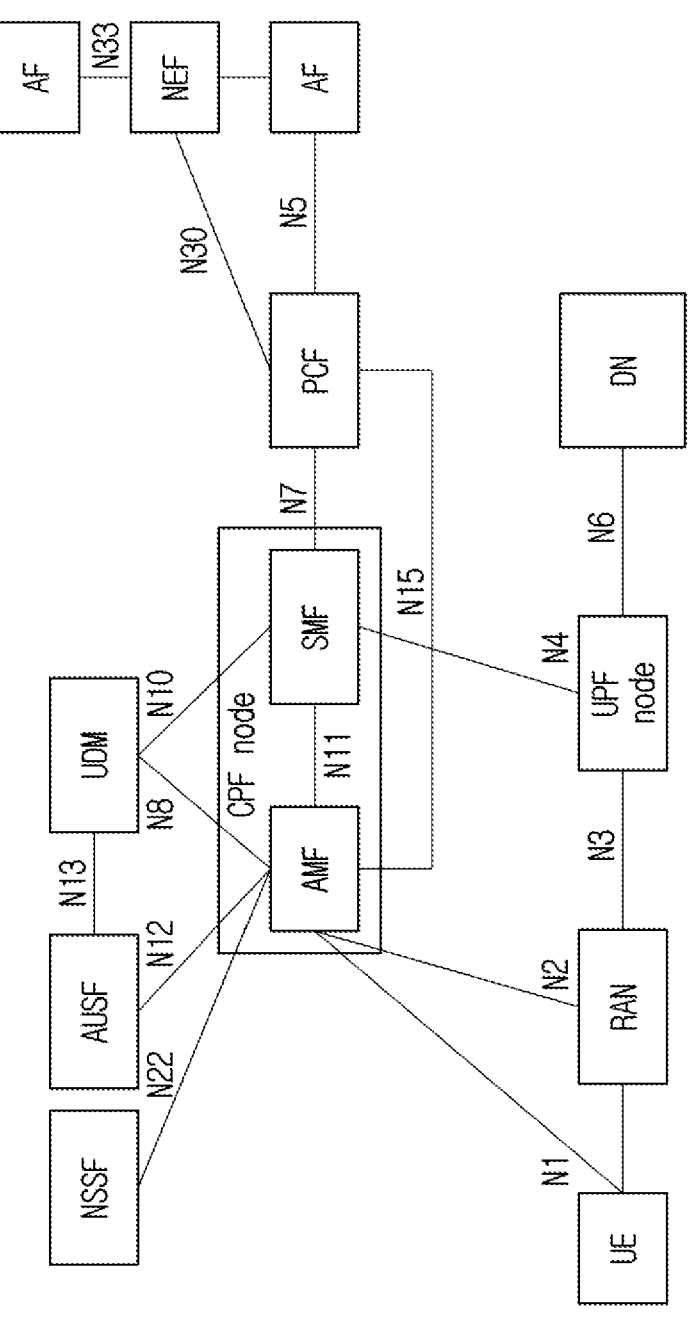
FIG. 7 is a view illustrating an example of functional separation of a general NG-RAN and a 5th generation core (5GC).

FIG. 7 is a view illustrating an example expressing a structure of a wireless communication system, which is applied to the present disclosure, from a node perspective.

Referring to FIG. 7, a UE is connected to a data network (DN) through a next generation RAN. A control plane function (CPF) node performs all or a part of the functions of a mobility management entity (MME) of 4G mobile communication and all or a part of serving gateway (S-GW) and PDN gateway (P-GW) functions. The CPF node includes AMF and SMF.

A UPF node performs a function of a gateway in which data of a user is transmitted and received.

An authentication server function (AUSF) authenticates and manages a UE. A network slice selection function (NSSF) is a node for network slicing described below.

A network exposure function (NEF) provides a mechanism that safely opens the service and function of 5G core.

Reference points in FIG. 7 are described as follows. N1 represents a reference point between UE and AMF. N2 represents a reference point between (R) AN and AMF. N3 represents a reference point between (R) AN and UPF. N4 represents a reference point between SMF and UPF. N5 represents a reference point between PCF and AF. N6 represents a reference point between UPF and DN. N7 represents a reference point between SMF and PCF. N8 represents a reference point between UDM and AMF. N9 represents a reference point between UPFs. N10 represents a reference point between UDM and SMF. N11 represents a reference point between AMF and SMF. N12 represents a reference point between AMF and AUSF. N13 represents a reference point between UDM and AUSF. N14 represents a reference point between AMFs. N15 represents a reference point between PCF and AMF in a non-roaming scenario and a reference point between AMF and PCF of a visited network in a roaming scenario. N16 represents a reference point between SMFs. N22 represents a reference point between AMF and NSSF. N30 represents a reference point between PCF and NEF. N33 may represent a reference point between AF and NEF, and the above-described entity and interface may be configured with reference to contents described in standard documents released earlier than the present document.

A radio interface protocol is based on the 3GPP radio access network standard. The radio interface protocol is horizontally divided into a physical layer, a data link layer, and a network layer, and is vertically divided into a user plane for transmission of data information and a control plane for transfer of control signal (signaling).

The protocol layers may be divided into L1 (layer-1), L2 (layer-2), and L3 (layer-3) based on the three lower layers of the open system interconnection (OSI) reference model widely known in communication systems.

Figure 8:
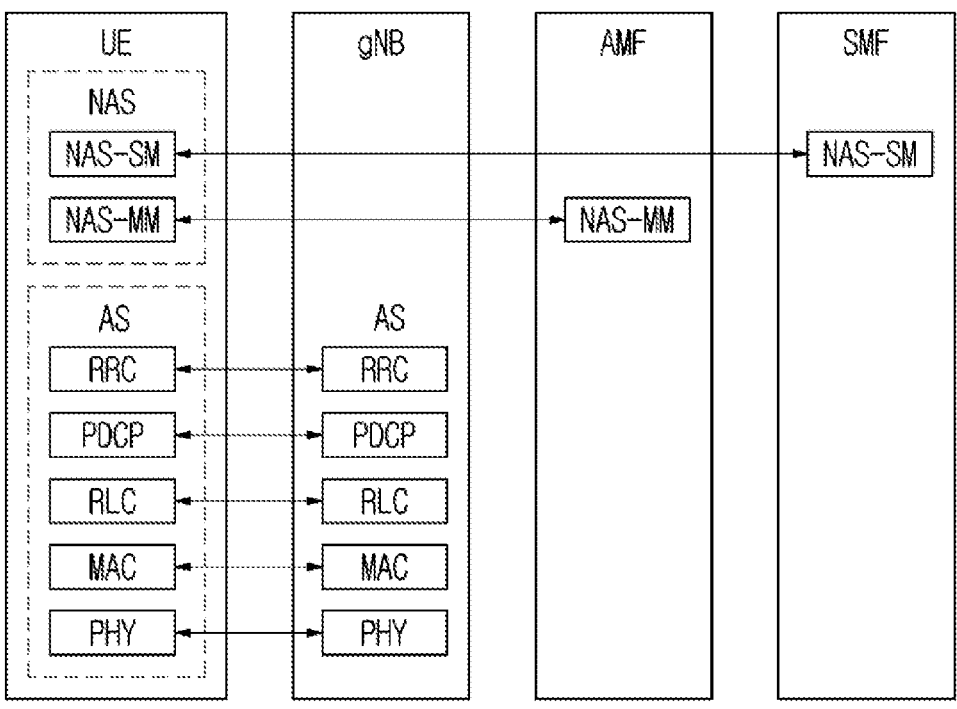
FIG. 8 is a view illustrating an example of a general architecture of a 5th generation (5G) system.

Hereinafter, the present disclosure will describe each layer of a radio protocol. FIG. 8 is a view illustrating an example of a radio interface protocol between UE and gBN.

Referring to FIG. 8, an access stratum (AS) layer may include a physical (PHY) layer, a medium access control layer, a radio link control (RLC) layer, a packet data convergence protocol (PDCP) layer, and a radio resource control (RRC) layer, and an operation based on each layer may be performed with reference to contents described standard documents released earlier than the present document.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Communication System Applicable to the Present Disclosure

Figure 9:
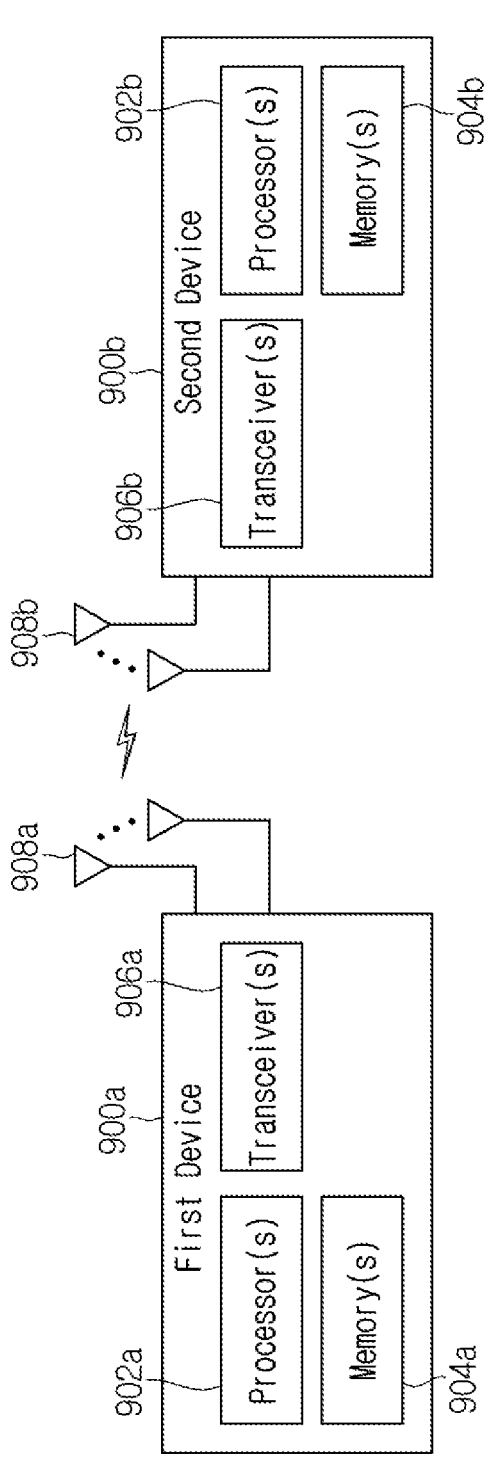
FIG. 9 is a view illustrating an example of a wireless device applicable to the present disclosure.

FIG. 9 is a view showing an example of a wireless device applicable to the present disclosure.

Referring to FIG. 9, a first wireless device 900a and a second wireless device 900b may transmit and receive radio signals through various radio access technologies (e.g., LTE or NR). Here, {the first wireless device 900a, the second wireless device 900b} may correspond to {the wireless device 100x, the base station 90} and/or {the wireless device 100x, the wireless device 100x}.

The first wireless device 900a may include one or more processors 902a and one or more memories 904a and may further include one or more transceivers 906a and/or one or more antennas 908a. The processor 902a may be configured to control the memory 904a and/or the transceiver 906a and to implement descriptions, functions, procedures, proposals, methods and/or operational flowcharts disclosed herein. For example, the processor 902a may process information in the memory 904a to generate first information/signal and then transmit a radio signal including the first information/signal through the transceiver 906a. In addition, the processor 902a may receive a radio signal including second information/signal through the transceiver 906a and then store information obtained from signal processing of the second information/signal in the memory 904a. The memory 904a may be coupled with the processor 902a, and store a variety of information related to operation of the processor 902a. For example, the memory 904a may store software code including instructions for performing all or some of the processes controlled by the processor 902a or performing the descriptions, functions, procedures, proposals, methods and/or operational flowcharts disclosed herein. Here, the processor 902a and the memory 904a may be part of a communication modem/circuit/chip designed to implement wireless communication technology (e.g., LTE or NR). The transceiver 906a may be coupled with the processor 902a to transmit and/or receive radio signals through one or more antennas 908a. The transceiver 906a may include a transmitter and/or a receiver. The transceiver 906a may be used interchangeably with a radio frequency (RF) unit. In the present disclosure, the wireless device may refer to a communication modem/circuit/chip.

The second wireless device 900b may include one or more processors 902b and one or more memories 904b and may further include one or more transceivers 906b and/or one or more antennas 908b. The processor 902b may be configured to control the memory 904*b* and/or the transceiver 906*b* and to implement the descriptions, functions, procedures, proposals, methods and/or operational flowcharts disclosed herein. For example, the processor 902*b* may process information in the memory 904*b* to generate third information/signal and then transmit the third information/signal through the transceiver 906*b*. In addition, the processor 902*b* may receive a radio signal including fourth information/signal through the transceiver 906*b* and then store information obtained from signal processing of the fourth information/signal in the memory 904*b*. The memory 904*b* may be coupled with the processor 902*b* to store a variety of information related to operation of the processor 902*b*. For example, the memory 904*b* may store software code including instructions for performing all or some of the processes controlled by the processor 902*b* or performing the descriptions, functions, procedures, proposals, methods and/or operational flowcharts disclosed herein. Herein, the processor 902*b* and the memory 904*b* may be part of a communication modem/circuit/chip designed to implement wireless communication technology (e.g., LTE or NR). The transceiver 906*b* may be coupled with the processor 902*b* to transmit and/or receive radio signals through one or more antennas 908*b*. The transceiver 906*b* may include a transmitter and/or a receiver. The transceiver 906*b* may be used interchangeably with a radio frequency (RF) unit. In the present disclosure, the wireless device may refer to a communication modem/circuit/chip.

In addition, the structure of a wireless device applicable to the present disclosure is not limited to FIG. 9, and may be configured in various forms. In particular, the present disclosure may be applied to a wireless device that performs an operation for transmitting and/or receiving a wireless signal, and is not limited to a specific form.

Figure 10:
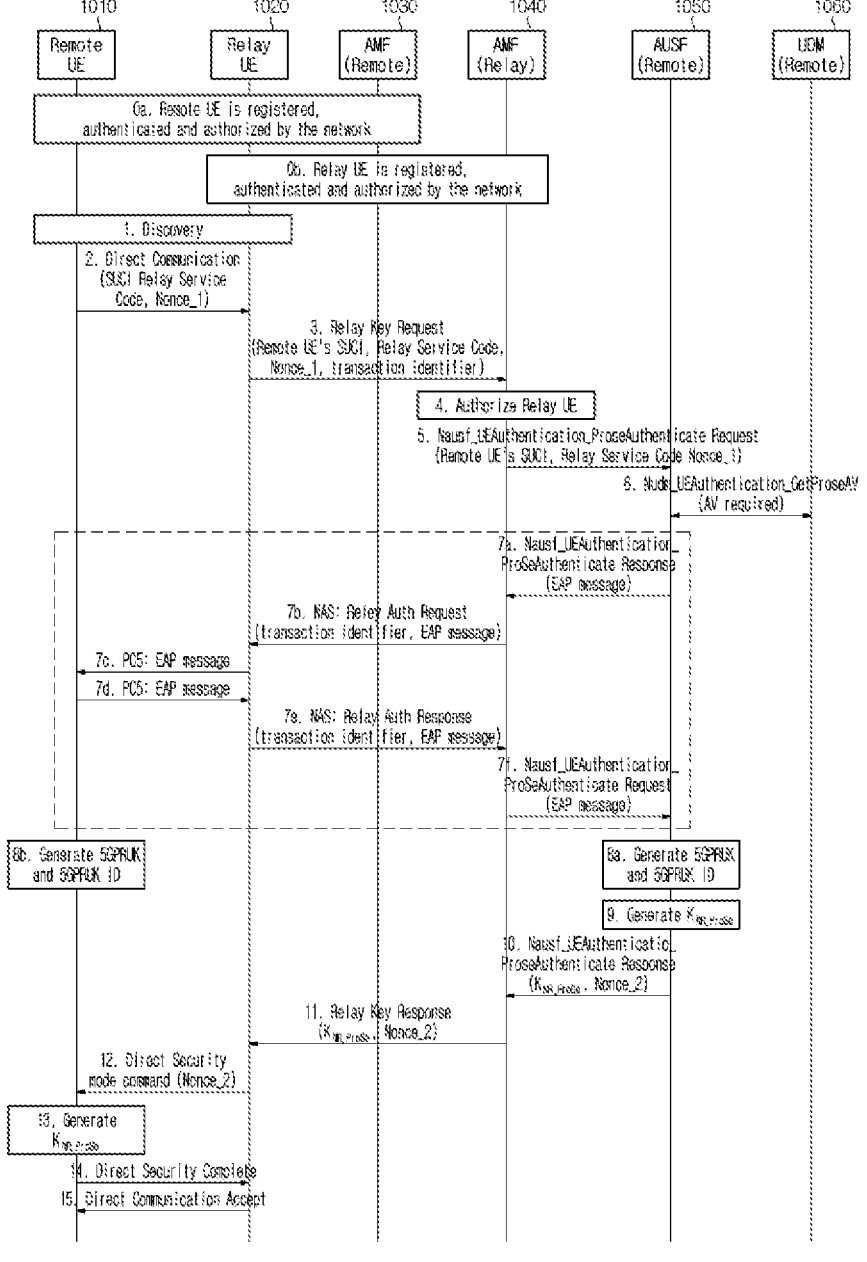
FIG. 10 is a view illustrating a method for configuring ProSe security according to an embodiment of the present disclosure.

FIG. 10 is a view illustrating a method for configuring ProSe security according to an embodiment of the present disclosure.

Referring to FIG. 10, a remote UE 1010 and a relay UE 1020 may be registered to a network respectively. As an example, the remote UE 1010 may perform authentication with a network in order to receive a ProSe UE-to-network relay service. A PC5 security setting between the remote UE 1010 and the relay UE 1020 may be established in a process where the remote UE 1010 and the relay UE 1020 implement an authentication procedure.

As an example, the remote UE 1010 and the relay UE 1020 may acquire information necessary for a ProSe relay service while being registered to a network respectively. Next, the remote UE 1010 may perform a discovery procedure for the relay UE 1020 and receive a ProSe relay service through any one relay UE 1020 thus discovered. After the discovery procedure for the relay UE 1020 is performed, the remote UE 1010 may transmit a direct communication request message in order to establish a PC5 link with the relay UE 1020. Herein, the direct communication request message may include a subscription concealed identifier (SUCI) as an identifier of the remote UE, a relay service code (RSC), and a nonce_1 value. As an example, the nonce_1 value may indicate a specific nonce value but is not limited to a specific form. The relay UE 1020 may deliver a relay key request, which includes not only the SUCI of the remote UE and the nonce_1 value acquired from the remote UE 1010 but also a transaction identifier enabling the remote UE to be identified, to an AMF 1040 of the relay UE. As an example, the transaction identifier may be an ID of a remote UE but may not be limited to a specific form. Next, the AMF 1040 of the relay UE 1020 may identify whether the relay UE 1020 is capable of providing a relay service. In case the relay UE 1020 is capable of providing a relay service, the AMF 1040 of the relay UE may deliver an authentication request message (Nausf_UEAuthentication_ProseAuthenticate Request), which includes the SUCI of the remote UE, the RSC and the nonce_1 value that were received, to the AUSF 1050 of the remote UE. As an example, the AMF 1040 of the relay UE may recognize a network of the remote UE through the SUCI of the remote UE and thus may deliver an authentication request message to the AUSF 1050 of the remote UE. Next, the AUSF 1050 of the remote UE may acquire authentication vectors (AV) from the UDM 1060 of the remote UE and, based on this, may deliver an authentication response message (Nausf_UEAuthentication_ProSeAuthentication Response) to the AMF 1050 of the relay UE.

Herein, the UDM 1060 of the remote UE may select EAP-AKA', and after authentication based on the selected EAP-AKA', the AUSF 1050 of the remote UE may generate and include an EAP message (EAP-request/AKS'-challenge) in an authentication response message. Next, the AMF 1040 of the relay UE may deliver, to the relay UE 1020, a relay authentication request message including the acquired EAP message and the transaction identifier as a NAS message. The relay UE 1020 may establish a PC5 connection with the remote UE 1010 based on the EAP message and transmit an authentication response message, which includes the EAP message and the transaction identifier acquired from the remote UE 1010, to the AMF 1040 of the relay UE. Next, the AMF 1040 of the relay UE may transmit an authentication request message (Nausf_UEAuthentication_ProSeAuthenticate Request), which includes the EAP message, to the AUSF 1050 of the remote UE. In case authentication is successful based on what is described above, the remote UE 1010 and the AUSF 1050 of the remote UE 1010 may generate 5GPRUK and 5GPRUKID respectively. Next, the AUSF 1050 of the remote UE may generate a KNR ProSe key and deliver a ProSe authentication response (Nausf_U-EAuthentication_ProSeAuthenticate response) message including $K_{NR\_ProSe}$ and a nonce_2 value to the AMF 1040 of the relay UE.

Next, the AMF 1040 of the relay UE may deliver a relay key response message including the $K_{NR\_ProSe}$ and the nonce_2 value to the relay UE 1020. The relay UE may deliver a direct security mode command including the nonce_2 value to the remote UE 1010. Based on the generated 5GPRUK and 5GPRUK ID and the nonce_2 value, the remote UE 1010 may generate and identify the above-described $K_{NR\_ProSe}$ and then deliver a direct security result (direct security complete) to the relay UE 1020.

Next, the relay UE 1020 may complete the procedure of establishing PC5 connection by establishing a direct communication accept message to the remote UE 1010.

Figure 11:
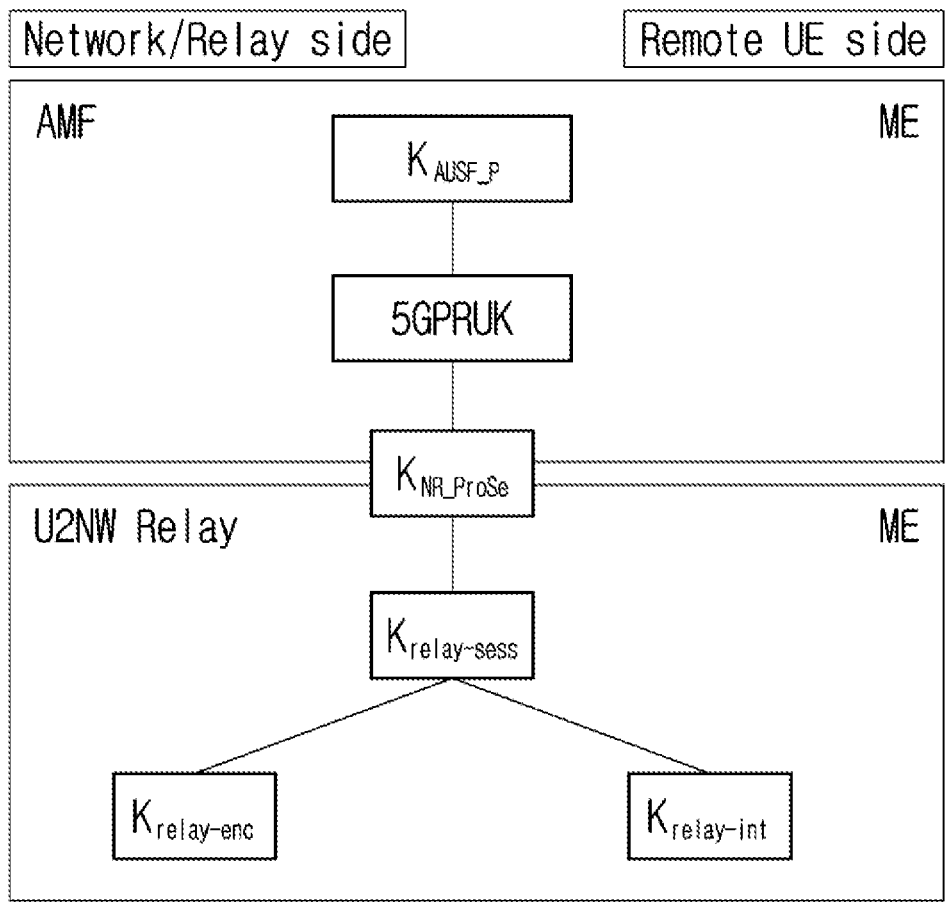
FIG. 11 is a view illustrating key information used in a procedure of establishing PC5 connection according to an embodiment of the present disclosure.

Herein, as an example, FIG. 11 is a view illustrating key information used in a procedure of establishing PC5 connection according to an embodiment of the present disclosure. Referring to FIG. 11, the above-described 5GPRUK may be derived by $K_{AUSF\_P}$. As an example, $K_{AUSE\_P}$ may be a key that is derived based on primary authentication, and $K_{AUSF\_P}$ may be different from KAUSF since it is used to derive 5GPRUK. 5GPRUK is a root credential key and may be used for security of a PC5 unicast link. In addition, $K_{NR\_ProSe}$ is a 256-bit root key and may be established between two entities of a PC5 unicast link. In addition, $K_{relay\text{-}sess}$ is a 256-bit key and may be derived by a UE through the above-described $K_{NR\_ProSe}$. $K_{relay\text{-}sess}$ may be used for data transmission between UEs. In addition, $K_{relay-int}$ and $K_{relay-enc}$ may be derived by $K_{relay-sess}$. Herein, $K_{relay-int}$ and $K_{relay-enc}$ may be used in a confidentiality algorithm and an integrity algorithm for PC5-S protection but may not be limited to the above-described embodiment.

Figure 12:
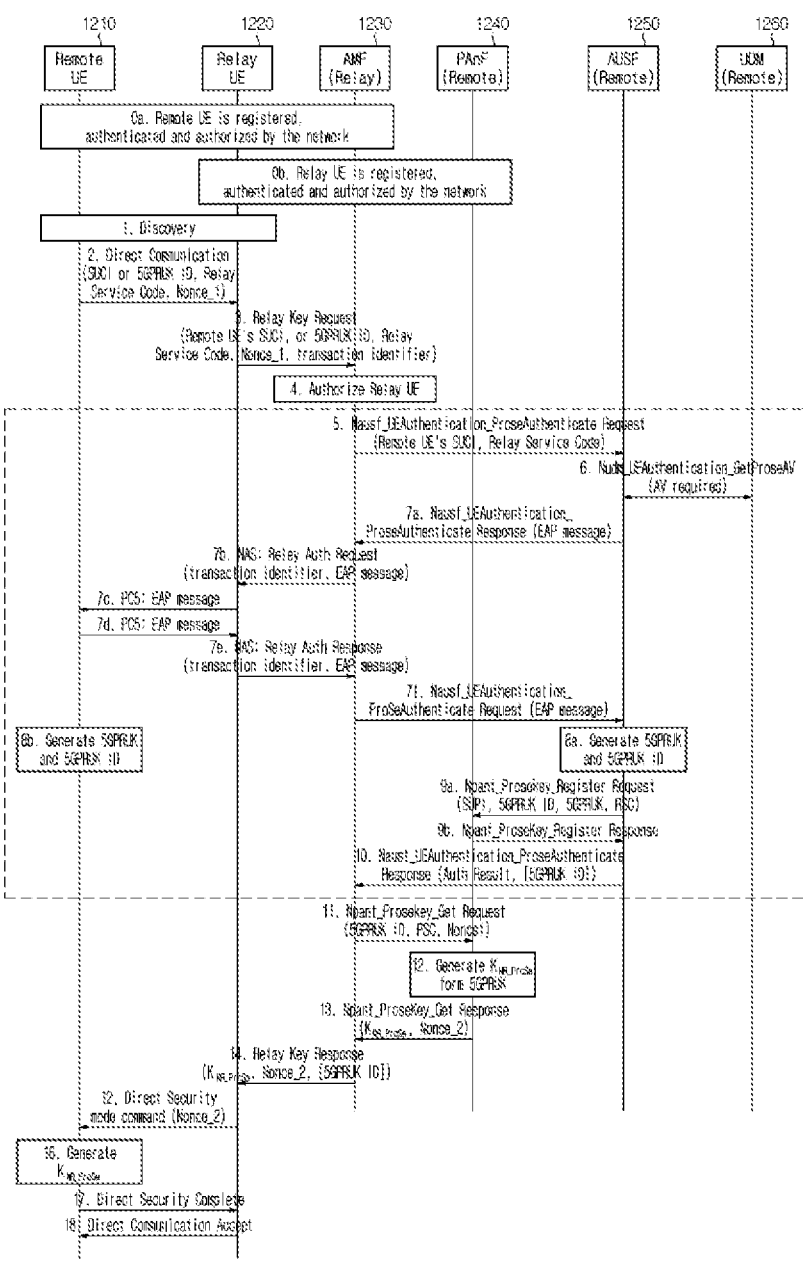
FIG. 12 is a view illustrating an operation considering PAnF according to an embodiment of the present disclosure.

FIG. 12 is a view illustrating an operation considering PAnF according to an embodiment of the present disclosure. As an example, in case a remote UE performs authentication through a relay UE based on FIG. 10, an AUSF of the remote UE needs to generate a key for authentication and perform an operation of storing the key. Herein, as an example, a ProSe anchor function (PAnF) may be used to replace the operation of the AUSF of the remote UE, which will be described below. In addition, as an example, in case a remote UE 1210 is connected to a 5G core network based on ProSe relay, after primary authentication between the remote UE 1210 and the 5G core network is performed, the remote UE 1210 may make a request for generating a PDU session to access a specific data network based on the ProSe relay. Herein, secondary authentication between the data network and the remote UE may be performed.

Herein, as the above-described secondary authentication process is operated through the relay UE 1220, it may be different from a secondary authentication process of an existing UE. As an example, the remote UE 1210 may perform secondary authentication through a network of a relay UE. Accordingly, the network of the relay UE needs to recognize a unique identifier (subscription permanent identifier, SUPI) of a remote UE that is not registered to the network of the relay UE, and a procedure for this may be necessary.

Herein, the ProSe anchor function (PAnF) 1260 may be a network function (NF) for storing a ProSe security key and an identifier of a UE, and a service operation (Npanf_Get service operation) based on PAnF may be described as in Table 1. As an example, the PAnF 1260 may store a SUPI of a remote UE, receive a remote UE SUPI request from another entity, and based on this, provide the SUPI of the remote UE.

TABLE 1

Npanf_Get service operation
Service operation name: Npanf_Get
Description: The NF consumer requests Remote UE's SUPI from the PAnF.
Input, Required: 5GPRUK ID.
Input, Optional: None.
Output, Required: Remote UE's SUPI.

As a concrete example, the network of the relay UE may acquire a SUPI of a remote UE, which is not registered to the network of the relay UE, based on PAnF.

Referring to FIG. 12, a remote UE 1210 and a relay UE 1220 may be registered to a network respectively. As an example, the remote UE 1210 may perform authentication with a network in order to receive a ProSe UE-to-network relay service. A PC5 security setting between the remote UE 1210 and the relay UE 1220 may be established in a process where the remote UE 1210 and the relay UE 1220 implement an authentication procedure.

As an example, the remote UE 1210 and the relay UE 1220 may acquire information necessary for a ProSe relay service, while being registered to a network respectively. Next, the remote UE 1210 may perform a discovery procedure for the relay UE 1220 and receive a ProSe relay service through any one relay UE 1220 thus discovered. After the discovery procedure for the relay UE 1220 is performed, the remote UE 1210 may transmit a direct communication request message in order to establish a PC5 link with the relay UE 1220. Herein, the direct communication request message may include a subscription concealed identifier (SUCI) as an identifier of the remote UE, a relay service code (RSC), and a nonce_1 value. As an example, the nonce_1 value may indicate a specific nonce value but is not limited to a specific form. The relay UE 1220 may deliver a relay key request, which includes not only the SUCI of the remote UE and the nonce_1 value acquired from the remote UE 1210 but also a transaction identifier enabling the remote UE to be identified, to an AMF 1240 of the relay UE. Next, the AMF 1240 of the relay UE 1220 may identify whether the relay UE 1220 is capable of providing a relay service. The AMF 1240 may deliver an authentication request message (Nausf_UEAuthentication_ProseAuthenticate Request), which includes the SUCI of the remote UE, the RSC and the nonce_1 value that were received, to the AUSF 1250 of the remote UE. Next, the AUSF 1250 of the remote UE may acquire authentication vectors (AV) from the UDM 1260 of the remote UE and, based on this, may deliver an authentication response message (Nausf_UEAuthentication_ProSeAuthentication Response) to the AMF 1230 of the relay UE. Herein, the UDM 1260 of the remote UE may select EAP-AKA', and after authentication based on the selected EAP-AKA', the AUSF 1250 of the remote UE may generate and include an EAP message (EAP-request/AKS'-challenge) in an authentication response message. Next, the AMF 1230 of the relay UE may deliver, to the relay UE 1220, a relay authentication request message including the acquired EAP message and the transaction identifier as a NAS message. The relay UE 1220 may establish a PC5 connection with the remote UE 1210 based on the EAP message and transmit an authentication response message, which includes the EAP message and the transaction identifier acquired from the remote UE 1210, to the AMF 1230 of the relay UE. Next, the AMF 1230 of the relay UE may transmit an authentication request message (Nausf_UEAuthentication_ProSeAuthenticate Request), which includes the EAP message, to the AUSF 1250 of the remote UE. In case authentication is successful based on what is described above, the remote UE 1210 and the AUSF 1250 of the remote UE 1210 may generate 5GPRUK and 5GPRUKID based on shared key information.

Herein, as an example, the AUSF 1250 of the remote UE may select PAnF 1240 and deliver a ProSe key registration request message (Npanf_ProseKey_Register Request message), which includes SUPI of the remote UE, 5GPRUK, 5GPRUK ID and RSC, to the selected PAnF 1240. Next, the PAnF 1240 may store ProSe context information for the remote UE. As an example, the ProSe context information may store at least one or more of SUPI, 5GPRUK, 5GPRUK ID and RSC. Next, the PAnF 1240 may transmit a ProSe key registration response message (Npanf_ProseKey_Register Response message) to the AUSF 1250 of the remote UE, and the PAnF 1240 may acquire and store the SUPI of the remote UE through the above-described process.

Next, the AUSF 1250 of the remote UE may deliver a ProSe authentication response (Nausf_UEAuthentication_ProSeAuthenticate response) message, which includes an authentication result and 5GPRUK ID, to the AMF 1230 of the relay UE. That is, unlike FIG. 10, the ProSe authentication response (Nausf_UEAuthentication_ProSeAuthenticate response) message may include authentication result information and 5GPRUK ID. Herein, the AMF 1230 of the relay UE may transmit a ProSe key request message (Npanf_ProseKey_Get Request) to the PAnF. The ProSe key request message may include at least one of 5GPRUK ID, RSC and a nonce_1 value. The PAnF 1240 may derive the above-described $K_{NR\_ProSe}$ from 5GPRUK and deliver a ProSe key response message (Npanf_ProseKey_Get Response), which includes $K_{NR\_ProSe}$ and a nonce_2 value, to the AMF 1230 of the relay UE. Next, the AMF 1230 of the relay UE may deliver a relay key response message to the relay UE 1220.

Next, the AMF 1230 of the relay UE may deliver a relay key response message including the $K_{NR\_ProSe}$, the nonce_2 value and the 5GPRUK ID to the relay UE 1220. The relay UE 1220 may deliver a direct security mode command including the nonce_2 value to the remote UE 1210. Based on the generated 5GPRUK and 5GPRUK ID and the nonce_2 value, the remote UE 1210 may generate and identify the above-described $K_{NR\_ProSe}$ and then deliver a direct security result (direct security complete) to the relay UE 1220.

Next, the relay UE 1220 may complete the procedure of establishing PC5 connection by establishing a direct communication accept message to the remote UE 1210.

Figure 13:
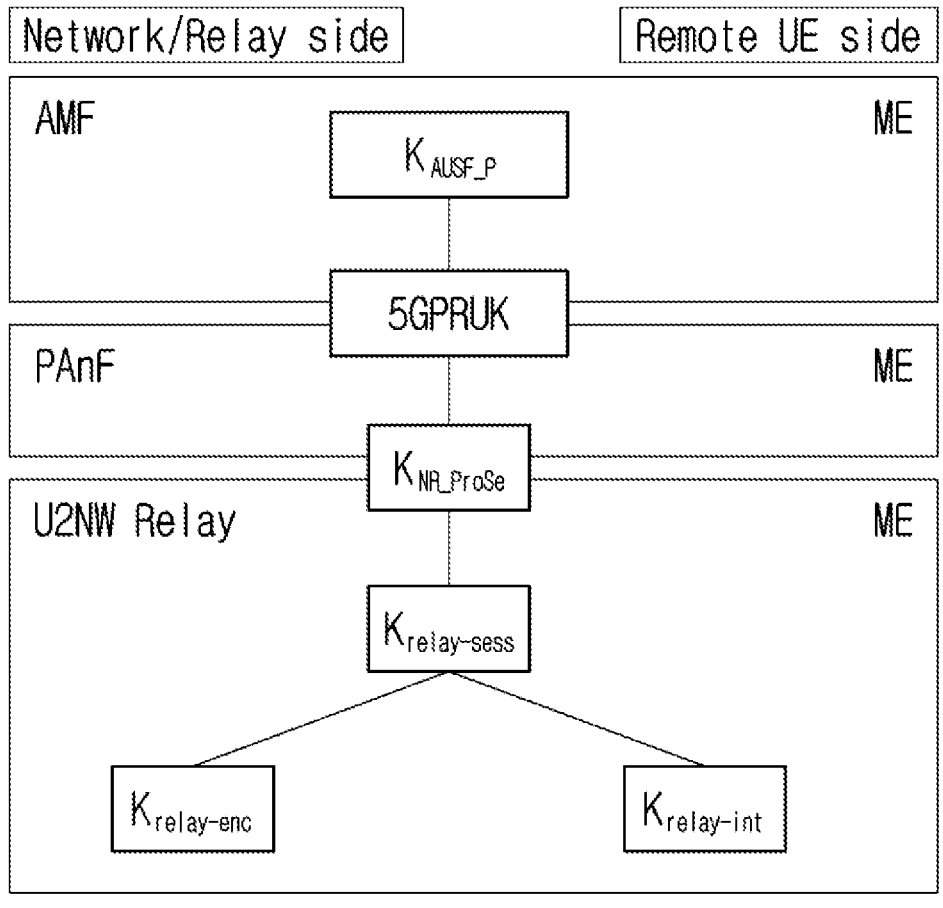
FIG. 13 is a view illustrating key information used in a procedure of establishing PC5 connection according to an embodiment of the present disclosure.

Herein, as an example, FIG. 13 is a view illustrating key information used in a procedure of establishing PC5 connection according to an embodiment of the present disclosure. Referring to FIG. 13, unlike FIG. 11, $K_{NR\_ProSe}$ may be managed by PAnF through a separate network function, and based on this, the network of the relay UE may acquire the SUPI of the remote UE, which will be described below.

Figure 14:
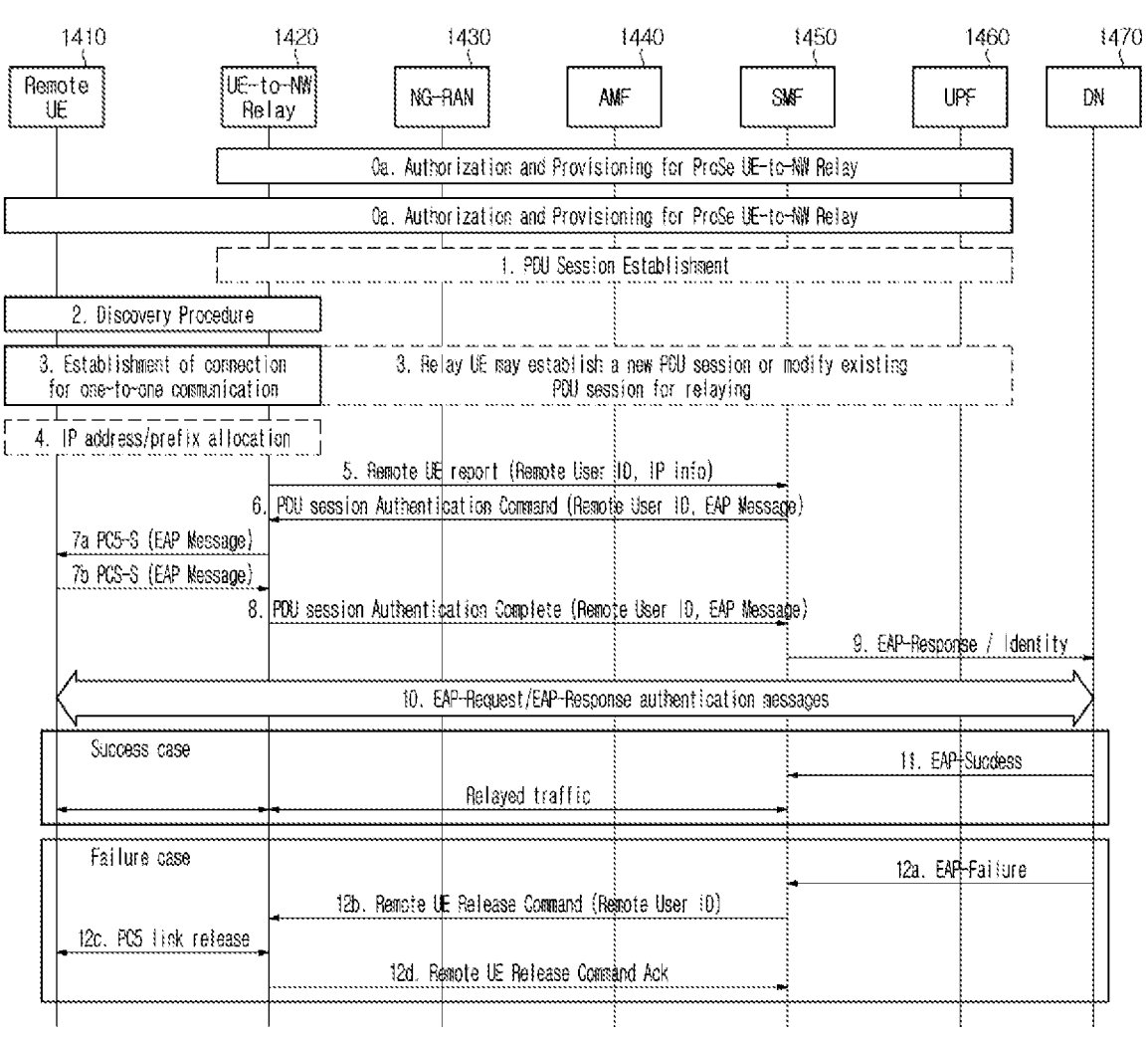
FIG. 14 is a view illustrating a method for performing secondary authentication after setting PC5 link according to an embodiment of the present disclosure.

FIG. 14 is a view illustrating a method for performing secondary authentication after setting PC5 link according to an embodiment of the present disclosure.

Referring to FIG. 14, a remote UE 1410 and a relay UE 1420 may perform pre-authentication from each network so as to operate in a ProSe UE-to-network relay system. Herein, each of the remote UE 1410 and the relay UE 1420 may receive information considering a ProSe relay operation. Information considering a ProSe relay operation may include information on an authentication scheme, information necessary for direct discovery between UEs, and other types of information, but is not limited to a specific form.

Next, the relay UE 1420 may generate a PDU session in advance which is capable of providing a relay service when the remote UE 1420 is being connected. The remote UE 1410 may perform a discovery procedure for the relay UE 1420 based on information considering a ProSe relay operation. As an example, the remote UE 1420 may perform a discovery for the relay UE 1420 based on information considering a ProSe relay operation.

Next, the remote UE 1410 may perform a connection establishment procedure for direct communication with the relay UE 1420, which is the same as described above. Herein, the remote UE 1410 may deliver an ID of the remote UE (e.g. SUCI) to the relay UE 1420. The relay UE 1420 may request AMF 1440 of the relay UE to authenticate the remote UE 1410 based on the received ID of the remote UE, which is the same as described above. Based on this, a network may perform primary authentication with the remote UE 1410 through the relay UE 1420.

Next, based on a result of the primary authentication, the remote UE 1410 and the relay UE 1420 may perform a direct security mode command procedure between the remote UE 1410 and the relay UE 1420 and configure a security channel in a PC5 interface.

As an example, in case there is no PDU session satisfying a PC5 connection requirement of the remote UE 1410, the relay UE 1420 may perform a procedure for establishing a new PDU session or a procedure for modifying a PDU session. As an example, the PC5 connection requirement may be set by considering at least one of S-NSSAI, DNN, QoS, and UP security enabled states, but is not limited to the above-described embodiment.

Next, the relay UE 1420 may transmit a remote UE report message to the SMF 1450. Herein, the remote UE report message may include at least one of a remote UE ID and remote UE information. As an example, the remote UE ID may be identification information of a remote UE user, and the remote UE information may be information used for identifying a remote UE in 5GC. Specifically, when a PDU session is an IP type, remote UE information may be IP information of a remote UE. On the other hand, when a PDU session is an ethernet type, remote UE information may be an MAC address of a remote UE. The SMF 1450 may store a remote UE ID and remote UE information in a context for a PDU session that is used for relay. Next, a PDU session of a relay UE, which is to be used by the remote UE 1410, may be completely configured. The remote UE 1410 may perform secondary authentication of a data network that will be connected with the remote UE 1410 according to a network setting.

Next, the relay UE 1420 may transmit an EAP message to the remote UE 1410 through PC5 signaling and receive an EAP message from the remote UE 1410 through PC5 signaling. The relay UE 1420 may transmit a PDU session authentication completion message, which includes an ID of the remote UE and an EAP message received the remote UE, to the SMF 1450. The SMF 1450 may transmit an EAP message to data network-authentication, authorization and accounting (DN-AAA) 1460. Next, the DN-AAA 1460 and the remote UE 1410 may exchange EAP messages. Herein, when authentication is successful, the DN-AAA 1460 may transmit an EAP success message to the SMF 1450, and the remote UE 1410 may perform communication through the relay UE 1420. On the other hand, when authentication fails, the DN-AAA 1460 may transmit an EAP failure message to the SMF 1450. The SMF 1450 may transmit a remote UE release command message including a remote UE ID to the relay UE 1420. The relay UE 1420 may release a PC5 link with the remote UE and transmit an ACK response for the remote UE release command message to the SMF 1450.

As an example, in case a remote UE is connected to a 5G core network based on ProSe relay, primary authentication between the remote UE and the 5G core network may be performed, which is the same as described above. The remote UE may request to generate a PDU session for access to a specific data network based on ProSe relay. Herein, secondary authentication between the data network and the remote UE may be performed.

Herein, as the above-described secondary authentication process is operated through the relay UE, it may be different from a secondary authentication process of an existing UE. As an example, a remote UE may perform secondary authentication through a network of a relay UE, which is the same as described above. Accordingly, the network of the relay UE needs to recognize a unique identifier (subscription permanent identifier, SUPI) of a remote UE that is not registered to the network of the relay UE, and a procedure for this may be necessary.

In addition, as an example, whether secondary authentication is required may be different according to an authentication server (DN-AAA) of a data network which a remote UE wants to access. Accordingly, it is necessary to identify, in a secondary authentication process of a remote UE, whether DN-AAA requires secondary authentication, and a procedure for this may be needed.

In consideration of what is described above, in case a remote UE performs secondary authentication through a relay UE, the relay UE and a network of the relay UE need to identify the remote UE and determine whether secondary authentication is necessary, which will be described below.

Figure 15:
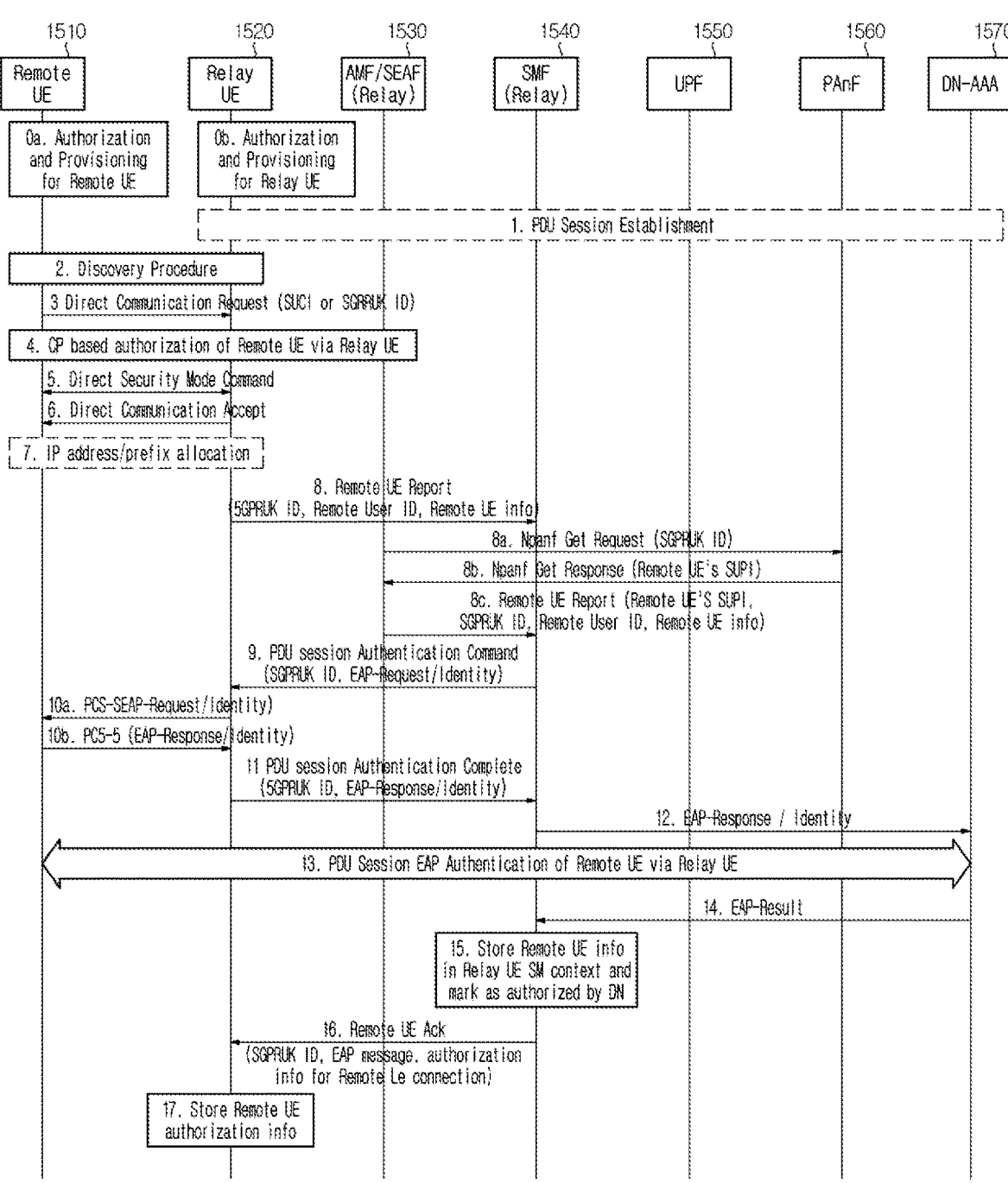
FIG. 15 is a view illustrating a method for performing secondary authentication of a remote UE according to an embodiment of the present disclosure.

FIG. 15 is a view illustrating a method for performing secondary authentication of a remote UE according to an embodiment of the present disclosure.

Referring to FIG. 15, a remote UE 1510 and a relay UE 1520 may acquire information necessary for a relay service after authenticating each other through a registration procedure via each network, which is the same as described above. As an example, the relay UE 1520 may set a default PDU session for providing a relay service based on received information or preset information in the UE (e.g. S-NSSAI, DNN, SSC mode, or PDU Session Type).

In addition, the remote UE 1510 may discover a neighbor relay UE 1520 through information acquired for a relay service. Next, the remote UE 1510 may select any one of discovered relay UEs 1520. The remote UE 1510 may transmit a direct communication request (DCR) message, which includes a subscription concealed identifier or 5GPRUK ID as an identifier of the remote UE, to the relay UE 1520.

Herein, as an example, in case the remote UE 1510 does not perform primary authentication with a network through the relay UE 1520, the DCR message may include a SUCI, and the procedure of FIG. 12 may be implemented.

On the other hand, in case the remote UE 1510 completes primary authentication with a network through the relay UE 1520, the DCR message may refer to an existing security context. In addition, since the primary authentication has been executed, the DCR message may include 5GPRUK ID instead of SUCI. As an example, 5GPRUK ID may be an identifier for identifying PRUK that is determined after ProSe authentication is completed, which may be the same as FIG. 13 described above.

As another example, in case the DCR message includes neither SUCI nor 5GPRUK ID, the relay UE 1520 may request the remote UE 1510 to provide SUCI but may not be limited thereto.

In case ProSe authentication for the remote UE 1510 is successful, the relay UE 1520 may perform a direct security mode command procedure with the remote UE 1510, thereby configuring a PC5 security channel. In case the remote UE 1510 and the relay UE 1520 successfully set the PC5 security channel, the relay UE 1520 may store a 5GPRUK ID. Next, the relay UE 1520 may transmit a direct communication accept (DCA) message to the remote UE 1510.

Herein, as an example, the DCA message may include indication information indicating that secondary authentication has not been completed for a PDU session of a relay UE that is used by the remote UE 1510. As shown in FIG. 14, the remote UE 1510 needs to perform secondary authentication based on a PDU session of a relay UE, which it uses, and the DCA message may include an indicator indicating whether the secondary authentication is completed.

As an example, the above-described DCR message may include a relay service code (RSC). The relay UE 1520 may determine whether a data network (DN) connected to the RSC of the DCR message requires the secondary authentication of a PDU session. Herein, in case the DN connected to the RSC requires the secondary authentication of the PDU session but the relay UE 1520 does not store secondary authentication execution information of the remote UE 1510, the DCA message may include indication information indicating that secondary authentication has not been completed for the PDU session of the relay UE which the remote UE 1510 uses.

That is, based on a direct communication request of the remote UE 1510, the relay UE 1520 may determine whether a DN connected to an RSC requires secondary authentication for a PDU session and may include indicator information in a DCA message based on whether secondary authentication for the remote UE 1510 is performed.

Herein, the relay UE 1520 needs to identify whether the DN requests secondary authentication for the remote UE 1510. As an example, the relay UE 1520 may determine whether secondary authentication is necessary for the remote UE 1510 based on whether secondary authentication has been executed in a process of generating or modifying a PDU session connected based on an RSC. That is, in case the relay UE 1520 performs secondary authentication in a process of generating or modifying the DN and the PDU session, secondary session may also be performed for the remote UE 1510. On the other hand, in case the relay UE 1520 does not perform secondary authentication in a process of generating or modifying the DN and the PDU session, secondary session for the remote UE 1510 may also not be necessary.

In case secondary authentication for a PDU session connected based on an RSC is necessary but secondary authentication execution information is not stored in the relay UE 1520, the relay UE 1520 may deliver, to the remote UE 1510, a DCA message including an indicator indicating that secondary authentication for the remote UE 1510 has not been completed. That is, based on the indicator included in the DCA message, the remote UE 1510 may recognize that secondary authentication is not completed. The remote UE 1510 may not perform data transmission and reception with the relay UE 1520 via a PC5 link until secondary authentication has been completed. As an example, the relay UE 1520 may configure a filter to block data transmission and reception until secondary authentication for the remote UE 1510 is successful, but the present disclosure is not limited thereto.

Next, the relay UE 1520 may transmit a remote UE report to the SMF 1540. Herein, the remote UE report may be an SM NAS message. As an example, the remote UE report may include at least one of 5GPRUK ID, a remote UE ID and information on a remote UE, but is not limited thereto. As an example, the information on a remote UE may be address information of the remote UE (e.g., IP or MAC address). Thus, the relay UE 1520 may provide information on the remote UE 1510 connected to the SMF 1540. Herein, as an example, the above-described SM NAS message may be logically delivered from the relay UE 1520 to the SMF 1540. That is, in actual transmission, the relay UE 1520 may transmit a message to the SMF 1540 through the AMF 1530 of the relay UE, and thus the SMF 1540 may receive the above-described message from the relay UE 1520.

5GPRUK ID may be used to identify the remote UE 1510 when transmitting and receiving a NAS message of the relay UE 1520. In case 5GPRUK ID is included in a NAS message, the AMF 1530 of the relay UE may select a ProSe anchor function (PAnF) 1560 based on information included in 5GPRUK ID. As an example, the PAnF 1560 may be a network function (NF) for storing a ProSe security key and an identifier of a UE, and a service operation (Npanf_Get service operation) based on PAnF may be described as in Table 1.

Next, the AMF 1530 of the relay UE may transmit a Npanf_Get Request message to the selected PAnF 1560.

Herein, the Npanf_Get Request may include 5GPRUK ID, thereby requesting a unique identifier (SUPI) of the remote UE 1510.

Next, based on the received 5GPRUK ID, the PAnF 1560 may discover a unique identifier (SUPI) of a remote UE. The PAnF 1560 may send the discovered SUPI of the remote UE to the AMF 1530 of a relay UE through a Npanf_Get Response message. Based on what is described above, the AMF 1530 of a relay UE may acquire SUPI information of a remote UE. As an example, the SMF 1540 of the relay UE may identify a network of the remote UE 1510 and subscription information of the remote UE 1510 through the SUPI of the remote UE. Accordingly, the AMF 1530 of the relay UE may deliver a remote UE report to the SMF 1540 by further including the SUPI of the remote UE in the report. That is, the AMF 1530 of the relay UE may deliver not only 5GPRUK ID, an ID of the remote UE and information on the remote UE but also the SUPI of the remote UE acquired from PAnF 1560 to the SMF 1540 together with the remote UE report.

Herein, in case the SMF 1540 receives the remote UE report, the SMF 1540 may acquire the subscription data of the remote UE from UDM of the remote UE based on the SUPI of the remote UE. As an example, there may be a roaming agreement in advance between a network of the remote UE and a network of the relay UE. Herein, the SMF 1540 may determine whether a data network (DN) to be accessed requires secondary authentication based on the subscription data of the remote UE. Thus, secondary authentication for the remote UE 1510 may be performed.

As another example, information regarding whether secondary authentication for a specific DN may be stored based on a DN list as separate setting information in the SMF 1540. As an example, the relay UE 1520 may generate a default PDU session with each specific DN for a relay service. Herein, in case a default PDU session is generated for respective DNs, it may be determined whether secondary authentication of the relay UE 1520 is needed for each of the DNs. As an example, the secondary authentication of the relay UE 1520 may be necessary for specific DNs, and the secondary authentication of the relay UE 1520 may not be necessary for other specific DNs. Herein, in case the secondary authentication of the relay UE 1520 is necessary for a specific DN, a remote UE accessing the DN through a PDU session of the relay UE may also need secondary authentication. On the other hand, in case the secondary authentication of the relay UE 1520 is not necessary for a another specific DN, a remote UE accessing the DN through a PDU session of the relay UE may not need secondary authentication either. That is, whether secondary authentication of the remote UE 1510 is needed may be determined based on whether secondary authentication of the relay UE 1520 is needed. Based on the subscription data of the relay UE 1520, the SMF 1540 may recognize whether secondary authentication is needed for each PDU session of the relay UE 1520 and may store corresponding information as setting information. That is, based on the setting information, the SMF 1540 may recognize a DN that requires secondary authentication, but is not limited to the above-described embodiment.

Herein, in case secondary authentication for the remote UE 1510 is determined to be necessary for a specific DN, the SMF 1540 may identify an SM context of the relay UE 1520 or a UDM of the remote UE 1510, which is stored in the SMF 1540. Thus, the SMF 1540 may determine whether the remote UE has performed secondary authentication for the same DN.

As an example, in case secondary authentication for the remote UE 1510 is not performed in advance, the SMF 1540 may perform secondary authentication for a PDU session of a relay UE that the remote UE 1510 uses. The SMF 1540 may deliver a PDU session authentication command, which includes an EAP-Request/Identity message and a 5GPRUK ID of the remote UE, to the relay UE 1520. Next, the relay UE 1520 may identify the target remote UE 1510 based on the received 5GPRUK ID and deliver the EAP-Request/Identity to the remote UE 1510 via a PC5 link. The remote UE 1510 may send an EAP-Response/Identity message as a response to the relay UE 1520 based on the received EAP-Request/Identity. Herein, the EAP-Response/Identity message may include a separate ID used for secondary authentication of a PDU session. The relay UE 1520 may include the EAP-Response/Identity message and the 5GPRUK ID, which are received from the remote UE 1510, in a PDU session authentication complete message, and deliver the message to the SMF 1540.

The SMF 1540 may deliver the EAP-Response/Identity message to DN-AAA 1570. Next, DN-AAA 1570 and the remote UE 1510 may exchange an EAP message that is required for secondary authentication. Herein, the SMF 1540 and the relay UE 1520 may include the 5GPRUK ID of the remote UE in a transmitted/received message in order to deliver an NAS message. Based on what is described above, secondary authentication may be performed for the remote UE 1510, and DN-AAA 1570 may deliver a secondary authentication result to the SMF 1540. As an example, an EAP-success or EAP-failure message based on the secondary authentication result may be delivered to the SMF 1540.

In case an EAP-success message is delivered based on success of secondary authentication, the SMF 1540 may store authentication information of a remote UE in at least one of an SM context (5G ProSe Layer-3 UE-to-Network Relay's SM context) and an UDM of the remote UE. As an example, the authentication information of a remote UE may include at least one of an ID (e.g., GPSI, SUPI) of the remote UE received from DN-AAA 1570, information regarding whether the authentication is successful, and additional information (e.g., QoS parameters), but is not limited to a specific embodiment. Next, the SMF 1540 may transmit a remote UE report ack message to the relay UE 1520. Herein, the remote UE report ack message may be a SM NAS message. The remote UE report ack message may include a secondary authentication result and 5GPRUK ID information of the remote UE. As another example, in case an EAP-failure message is delivered based on failure of secondary authentication, a remote UE report ack message may include an indicator indicating PC5 link release from the remote UE 1510 but is not limited to the above-described embodiment.

When the secondary authentication of the remote UE 1510 is successful, the relay UE 1520 may also store secondary authentication information of the remote UE 1510. On the other hand, the secondary authentication of the remote UE 1510 fails, the relay UE 1520 may perform a PC5 link to the remote UE 1510. Herein, a PDU session of the relay UE, which the remote UE 1510 has used, may be maintained for another remote UE or next use. On the other hand, the PDU session of the relay UE needs not be maintained, the PDU session may be released but is not limited to a specific embodiment.

Figure 16:
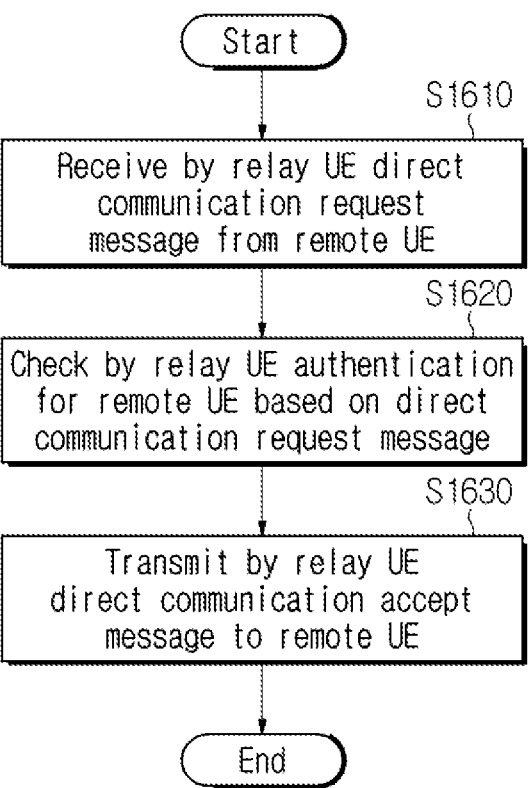
FIG. 16 is a flowchart for a method for authenticating a UE according to an embodiment of the present disclosure.

FIG. 16 is a flowchart for a method for authenticating a UE according to an embodiment of the present disclosure.

Referring to FIG. 16, a relay UE may receive a direct communication request message from a remote UE (S1610). Herein, the direct communication request message may include any one of a first unique identifier or a key ID associated with primary authentication of the remote UE. As an example, the first unique identifier of the remote UE may be a SUCI of the remote UE. In addition, the key ID associated with primary authentication may be 5GPRUK ID and is not limited to a specific embodiment.

Herein, in case the remote UE and the relay UE have not completed primary authentication, the direct communication request message may include the first unique ID of the remote UE. On the other, in case the remote UE and the relay UE complete primary authentication, the relay UE may store information on the primary authentication. Accordingly, the remote UE may include not SUCI but 5GPRUK ID in the direct communication request message and transmit it. Next, based on the direct communication request message, the relay UE may identify authentication for the remote UE (S1620). Next, the relay UE may transmit a direct communication accept message to the remote UE. Herein, the direct communication accept message may include an indicator indicating whether secondary authentication of a protocol data unit (PDU) session of the relay UE, which the remote UE uses, is pending. As an example, an indicator indicating whether secondary authentication of the PDU session of the relay UE is pending may be an indicator indicating that secondary authentication is not completed for the PDU session of the relay UE, which the remote UE uses, and may be the same as described in FIG. 15.

In addition, as an example, in case a relay UE acquires a primary authentication-related key ID (e.g. 5GPRUK ID) through a direct communication request message, the relay UE may deliver the primary authentication-related key ID and information on a remote UE to a network of the relay UE. Specifically, a relay UE may deliver a primary authentication-related key ID and information on a remote UE in a remote UE report to an SMF through an AMF. Herein, a network of a relay UE may acquire a second unique identifier of a remote UE from a first entity based on a primary authentication-related key ID. Herein, as an example, the second unique identifier may be a SUPI of the remote UE. In addition, as an example, a first entity may be the above-described PAnF. Specifically, an AMF of a relay UE may request and acquire a SUPI of a remote UE to and from a PAnF based on primary authentication-related key ID of the remote UE. Next, the AMF of the relay UE may transmit the primary authentication-related key ID, information on the remote UE and the acquired SUPI of the remote UE to the SMF. As an example, a network of a relay UE may identify subscription data of a remote UE from a network of the remote UE based on an acquired second unique identifier of the remote UE and identify whether secondary authentication is necessary for a data network indicated based on the subscription data of the remote UE.

Herein, as described above, in case secondary authentication is needed for a data network indicated based on subscription data of a remote UE, a network of a relay UE may perform secondary authentication for the data network indicated based on the remote UE and the subscription data of the remote UE.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

What is claimed is:

1. A method for authenticating a user equipment in a wireless communication system, the method comprising:
receiving, by a relay user equipment, a direct communication request message from a remote user equipment;
identifying, by the relay user equipment, that secondary authentication for the remote user equipment is needed based on the direct communication request message by identifying whether secondary authentication has been performed in a process of generating or modifying a protocol data unit (PDU) session based on a relay service code (RSC) in the direct communication request message; and
transmitting, by the relay user equipment, a direct communication accept message to the remote user equipment,
wherein the direct communication request message includes at least one of a first unique identifier or a primary authentication-related key ID of the remote user equipment, and
wherein the direct communication accept message includes an indicator indicating whether secondary authentication of the PDU session of the relay user equipment, which the remote user equipment uses, is pending.

2. The method of claim 1,
wherein the relay user equipment identifies whether secondary authentication is needed for a data network associated with the PDU session of the relay user equipment, which is used by the remote user equipment that is connected based on the RSC.

3. The method of claim 2, wherein the relay user equipment identifies whether secondary authentication is needed for the data network associated with the PDU session of the relay user equipment, which the remote user equipment uses, based on whether the relay user equipment has performed secondary authentication in the process of generating or modifying the PDU session of the relay user equipment associated with the data network for a relay service.

4. The method of claim 3, wherein, based on the relay user equipment performing secondary authentication in the process of generating or modifying the PDU session of the relay user equipment, the secondary authentication is needed for the data network associated with the PDU session of the relay user equipment that the remote user equipment uses, and
wherein, based on the relay user equipment not performing secondary authentication in the process of generating or modifying the PDU session of the relay user equipment, the secondary authentication is not needed for the data network associated with the PDU session of the relay user equipment that the remote user equipment uses.

5. The method of claim 4, wherein the secondary authentication is needed for the data network associated with the PDU session of the relay user equipment that the remote user equipment uses, and wherein, based on the relay user equipment not storing secondary authentication execution information of the remote user equipment, an indicator indicating whether the secondary authentication of the PDU session of the relay user equipment that the remote user equipment uses is pending is included in the direct communication accept message and is transmitted to the remote user equipment.

6. The method of claim 1, wherein, based on the remote user equipment and the relay user equipment not completing primary authentication, the direct communication request message includes the first unique identifier of the remote user equipment, and wherein, based on the remote user equipment and the relay user equipment completing primary authentication, the direct communication request message includes the primary authentication-related key ID.

7. The method of claim 6, wherein, based on the relay user equipment acquiring the primary authentication-related key ID through the direct communication request message, the relay user equipment delivers the primary authentication-related key ID and information on the remote user equipment to a network of the relay user equipment.

8. The method of claim 7, wherein the network of the relay user equipment acquires a second unique identifier of the remote user equipment from a first entity based on the primary authentication-related key ID, and wherein the network of the relay user equipment identifies subscription information of the remote user equipment from a network of the remote user equipment based on the acquired second unique identifier of the remote user equipment and identifies whether secondary authentication is needed for a data network indicated based on the subscription information of the remote user equipment.

9. The method of claim 8, wherein, based on the secondary authentication being needed for the data network indicated based on the subscription information of the remote user equipment, the network of the relay user equipment performs the secondary authentication for the data network indicated based on the remote user equipment and the subscription information of the remote user equipment.

10. The method of claim 8, wherein the second unique identifier is a subscription permanent identifier (SUPI) of the remote user equipment.

11. The method of claim 1, wherein the first unique identifier is a subscription concealed identifier (SUCI) of the remote user equipment, and wherein the primary authentication-related key ID is 5GPRUK ID.

12. A relay user equipment operating in a wireless communication system, the relay user equipment comprising:

at least one transceiver;

at least one processor; and at least one memory coupled with the at least one processor in an operable manner and configured, when operated, to store instructions for the at least one processor to implement a specific operation, wherein the specific operation is configured to:

control the transceiver to receive a direct communication request message from a remote user equipment, identify that secondary authentication for the remote user equipment is needed based on the direct communication request message by identifying whether secondary authentication has been performed in a process of generating or modifying a protocol data unit (PDU) session based on a relay service code (RSC) in the direct communication request message, and control the transceiver to transmit a direct communication accept message to the remote user equipment, wherein the direct communication request message includes at least one of a first unique identifier or a key ID associated with primary authentication of the remote user equipment, and wherein the direct communication accept message includes an indicator indicating whether secondary authentication of the PDU session of the relay user equipment, which the remote user equipment uses, is pending.

* * * * *